(12) United States Patent
Grubb

(10) Patent No.: US 10,545,513 B2
(45) Date of Patent: Jan. 28, 2020

(54) CASCADED ADAPTIVE FILTERS FOR ATTENUATING NOISE IN A FEEDBACK PATH OF A FLOW CONTROLLER

(71) Applicant: Norgren Limited, Lichfield, Staffordshire (GB)

(72) Inventor: Mark Richard Grubb, Lichfield (GB)

(73) Assignee: NORGREN LIMITED (GB)

( * ) Notice: Subject to any disclaimer, the term of this patent is extended or adjusted under 35 U.S.C. 154(b) by 160 days.

(21) Appl. No.: 15/751,983

(22) PCT Filed: Aug. 10, 2016

(86) PCT No.: PCT/GB2016/052478
§ 371 (c)(1),
(2) Date: Feb. 12, 2018

(87) PCT Pub. No.: WO2017/025740
PCT Pub. Date: Feb. 16, 2017

(65) Prior Publication Data
US 2018/0231989 A1   Aug. 16, 2018

(30) Foreign Application Priority Data
Aug. 12, 2015  (GB) .................................. 1514220.1

(51) Int. Cl.
*G05D 7/00*    (2006.01)
*G05D 7/06*    (2006.01)
(Continued)

(52) U.S. Cl.
CPC ............. *G05D 7/0629* (2013.01); *G01F 1/72* (2013.01); *G01F 15/005* (2013.01)

(58) Field of Classification Search
CPC ...... G05D 7/0629; G05D 7/0635; G01F 1/72; G01F 15/005; G05B 13/048
See application file for complete search history.

(56) References Cited

U.S. PATENT DOCUMENTS 4,677,676 A  *  6/1987  Eriksson .............. G10K 11/178
                                                         381/71.11
4,977,613 A  *  12/1990  Holcomb, Sr. ........ H03D 7/163
                                                         331/1 A
(Continued)

OTHER PUBLICATIONS

Corresponding International Search Report and Written Opinion for PCT/GB2016/052478 dated Nov. 7, 2016.

*Primary Examiner* — Ronald D Hartman, Jr.
(74) *Attorney, Agent, or Firm* — The Belles Group, P.C.

(57) ABSTRACT

An electronics with cascaded adaptive filters for attenuating noise in a feedback path of a flow controller is provided. The electronics includes a signal processor configured to receive a flow signal from a flow sensor, the flow sensor being configured to measure a flow rate of the pulsating flow, generate a noise reference signal from the flow signal and generate a flow rate signal using the noise reference signal. The electronics also includes a controller communicatively coupled to the signal processor, the controller being configured to generate a flow rate control signal using the flow rate signal, and a signal generator communicatively coupled to the controller. The signal generator is configured to receive the flow rate control signal, generate a valve signal based on the flow rate control signal, and provide the valve signal to a valve to control the flow rate of the pulsating flow.

15 Claims, 6 Drawing Sheets

(51) Int. Cl.
*G01F 1/72* (2006.01)
*G01F 15/00* (2006.01)

(56) References Cited

U.S. PATENT DOCUMENTS

| | | | |
|---|---|---|---|
| 5,038,269 A * | 8/1991 | Grimble | G05B 13/042 |
| | | | 700/37 |
| 5,396,414 A * | 3/1995 | Alcone | G05B 13/021 |
| | | | 700/55 |
| 5,982,253 A * | 11/1999 | Perrin | H01R 13/719 |
| | | | 333/182 |
| 6,389,364 B1 | 5/2002 | Vyers | |
| 6,665,410 B1 * | 12/2003 | Parkins | A61F 11/06 |
| | | | 381/71.1 |
| 9,824,678 B1 * | 11/2017 | Ou | G10K 11/178 |
| 10,373,600 B2 * | 8/2019 | Christoph | |
| 2002/0051508 A1 * | 5/2002 | Tachimori | H03L 7/0891 |
| | | | 375/376 |
| 2005/0062550 A1 * | 3/2005 | Melanson | H03L 7/093 |
| | | | 331/17 |
| 2006/0141963 A1 * | 6/2006 | Maxim | H03L 7/0891 |
| | | | 455/192.1 |
| 2010/0066442 A1 * | 3/2010 | Mu | H03H 11/1291 |
| | | | 327/553 |
| 2010/0124341 A1 * | 5/2010 | Kano | H04R 1/1083 |
| | | | 381/94.1 |
| 2010/0183164 A1 * | 7/2010 | Elmedyb | H04R 3/02 |
| | | | 381/71.8 |
| 2010/0266134 A1 | 10/2010 | Wertz et al. | |
| 2011/0015791 A1 | 1/2011 | Smirnov et al. | |
| 2012/0192657 A1 | 8/2012 | Gossner | |
| 2014/0241467 A1 * | 8/2014 | Huang | H03L 7/00 |
| | | | 375/327 |
| 2014/0266843 A1 * | 9/2014 | Pagnanelli | H03M 3/468 |
| | | | 341/155 |
| 2016/0233968 A1 * | 8/2016 | Yin | H04B 1/30 |
| 2016/0248319 A1 * | 8/2016 | Meehan | H02M 1/44 |
| 2017/0047881 A1 * | 2/2017 | Shimura | H02P 29/50 |

* cited by examiner

CASCADED ADAPTIVE FILTERS FOR ATTENUATING NOISE IN A FEEDBACK PATH OF A FLOW CONTROLLER

CROSS-REFERENCE TO RELATED APPLICATIONS

This application is a U.S. national stage application under 35 U.S.C. § 371 of PCT Application No. PCT/GB2016/052478, filed Aug. 10, 2016, which claims priority to United Kingdom Patent Application No. GB1514220.1, filed Aug. 12, 2015, the entireties of which are incorporated herein by reference.

TECHNICAL FIELD

The embodiments described below relate to attenuating noise and, more particularly, to cascaded adaptive filters for attenuating noise in a feedback path of a flow controller.

BACKGROUND

Fluid can be obtained from different sources, one of which is a pump that receives a fluid from a fluid supply, displaces the fluid with a mechanical means, and provides the fluid to, for example, a conduit. The mechanical means employed by the pump may be a member with a reciprocal motion, such as pistons, peristaltic rotors, or the like. The reciprocal motion periodically displaces the fluid towards the conduit, thereby causing the fluid to flow. Due to the reciprocal motion, the fluid provided by the pump may have pulses that are carried downstream through the conduit. Accordingly, the pulses are sometimes referred to as fluid born noise ("FBN"). Fluid flow with the FBN is commonly referred to as a pulsating flow.

In addition, flow path geometries formed by conduits with bends, surface irregularities, or the like, can introduce vortices due to vortex shedding. For example, even in laminar fluid flows, vortexes might be generated by the flow path geometry. These vortex trains typically have an interval that is proportional to the flow rate. Accordingly, the faster the fluid flow, the faster the perturbations that are generated by the vortex trains. These vortex trains might travel a distance downstream before the flow re-laminarises. In a simplification for sake of discussion, the portion of the fluid flow with the vortex trains may be viewed as a pulsating flow.

The pumps and the conduits with bends and surface irregularities are typically used in fluid control systems with a valve. The valve may be a proportional valve, although many other valves or flow controllers may be employed with the pumps. For example, a proportional valve downstream from the pump may control a flow rate of the fluid with a flow sensor. More specifically, the flow sensor may measure the flow rate of the fluid flowing through the conduit and provide a flow rate signal to the valve. The flow rate signal can be proportional to the measured flow rate of the fluid. Using the flow rate signal, the proportional valve may control the flow rate of the fluid through the conduit.

However, due to the FBN, perturbations, or other disturbances in the fluid flow, the flow rate signal may also include noise. The noise can cause the proportional valve to be unstable. For example, a position of the proportional valve may not correspond to a flow rate set point and, instead, may continuously oscillate about the set point. Accordingly, it is desirable to attenuate the noise in the flow rate signal.

Passive filters can attenuate the noise component if the noise component has a known or constant frequency. However, the noise component's frequency is correlated with the pump speed. For example, as the pump's rotation speed increases, the noise component's frequency also increases. In addition, the flow rate of the fluid flow may also rapidly change due to various reasons, such as a rapid change in the flow rate set point. Due to the rapid change, the flow rate measurement can have some components with a frequency greater than zero. The passive filters may undesirably attenuate the rapid changes in the flow rate measurements, thereby causing inaccurate flow rate measurements.

These and other issues may be resolved by employing adaptive filters. The adaptive filters may use a noise reference to adaptively filter the noise component in the flow rate signal. For example, if the frequency of the noise changes, the adaptive filter can track the frequency using the noise reference. However, the noise reference may need to be an accurate representation of the noise component in the flow rate signal. If the accurate representation could be obtained from a second filter cascaded with the adaptive filter, then the noise component may be attenuated without undesirably canceling other components in the flow rate signal. Accordingly, there is a need for cascaded adaptive filters for attenuating noise in a feedback path of a flow controller.

SUMMARY

An electronics with cascaded adaptive filters for attenuating noise in a feedback path of a flow controller is provided. According to an embodiment, the electronics is comprised of a signal processor configured to receive a flow signal from a flow sensor, the flow sensor being configured to measure a flow rate of the pulsating flow generate a noise reference from the flow signal, and generate a flow rate signal using the noise reference signal. The electronics also includes a controller communicatively coupled to the signal processor, the controller being configured to generate a flow rate control signal using the flow rate signal and a signal generator communicatively coupled to the controller. The signal generator is configured to receive the flow rate control signal, generate a valve signal based on the flow rate control signal, and provide the valve signal to a valve to control the flow rate of the pulsating flow.

A method employing cascaded adaptive filters for attenuating noise in a feedback path of a flow controller is provided. According to an embodiment, the method comprises receiving a flow signal from a flow sensor, the flow sensor being configured to measure a flow rate of the pulsating flow, generating a noise reference signal from the flow signal, and generating a flow rate signal using the noise reference signal. The method also comprises generating a flow rate control signal using the flow rate signal, receiving the flow rate control signal, generating a valve signal based on the flow rate control signal, and providing the valve signal to a valve to control the flow rate of the pulsating flow.

A system with cascaded adaptive filters for attenuating noise in a feedback path of a flow controller is provided. According to an embodiment, the system comprises a fluid control system comprising a valve and a flow sensor fluidly coupled to the valve. The system also includes an electronics communicatively coupled to the valve and the flow sensor, the flow sensor being configured to measure a flow rate of the pulsating flow. The electronics is configured to receive a flow signal from a flow sensor, generate a noise reference signal from the flow signal, and generate a flow rate signal using the noise reference signal. The electronics is also configured to generate a flow rate control signal using the flow rate signal, generate a valve signal based on the flow rate control signal and provide the valve signal to the valve to control the flow rate of the pulsating flow.

Aspects

According to an aspect, an electronics (100, 400) with cascaded adaptive filters for attenuating noise in a feedback path of a flow controller. The electronics (100, 400) comprises a signal processor (110, 410) configured to receive a flow signal (220a) from a flow sensor (220), the flow sensor (220) being configured to measure a flow rate of the pulsating flow, generate a noise reference signal (110b, 410b) from the flow signal (220a) and generate a flow rate signal (110a, 410a) using the noise reference signal (110b, 410b). The electronics (100, 400) also comprises a controller (120) communicatively coupled to the signal processor (110), the controller (120) being configured to generate a flow rate control signal (120a) using the flow rate signal (110a, 410a). The electronics (100, 400) further comprises a signal generator (130) communicatively coupled to the controller (120). The signal generator (130) is configured to receive the flow rate control signal (120a), generate a valve signal (130a) based on the flow rate control signal (120a), and provide the valve signal (130a) to a valve (210) to control the flow rate of the pulsating flow.

Preferably, the signal processor (110, 410) being configured to generate the noise reference signal (110b, 410b) from the flow signal (220a) comprises the signal processor (110, 410) being configured to receive a first feedback error (e1) from the noise reference signal (110b, 410b), determine coefficients using the first feedback error (e1), and generate an estimate of a DC component in the flow signal (220a) using the coefficients.

Preferably, the signal processor (110, 410) being configured to generate the flow rate signal (110a, 410a) using the noise reference signal (110b, 410b) comprises the signal processor (110, 410) being configured to receive the noise reference signal (110b, 410b), receive a second feedback error (e2) from the flow rate signal (110a, 410a), and generate the flow rate signal (110a, 410a) using the noise reference signal (110b, 410b) and the second feedback error (e2).

Preferably, the signal processor (110, 410) is comprised of a first filter (112), the first filter (112) being a DC canceller that generates the noise reference signal (110b, 410b) from the flow signal (220a) by attenuating a DC component in the flow signal (220a).

Preferably, the signal processor (110, 410) is comprised of a second filter (114), the second filter (114) being an adaptive noise cancelling filter configured to generate the flow rate signal (110a, 410a) from the noise reference signal (110b, 410b) by attenuating a noise component in one of the flow signal (220a) and a filtered flow signal (410c).

Preferably, the signal generator (130) is comprised of a pulse width modulator (132) and a valve drive (134).

According to an aspect, a method employing cascaded adaptive filters for attenuating noise in a feedback path of a flow controller comprises receiving a flow signal from a flow sensor, the flow sensor being configured to measure a flow rate of the pulsating flow, generating a noise reference signal from the flow signal, and generating a flow rate signal using the noise reference signal. The method also comprises generating a flow rate control signal using the flow rate signal, receiving the flow rate control signal, generating a valve signal based on the flow rate control signal, and providing the valve signal to a valve to control the flow rate of the pulsating flow.

Preferably, generating the noise reference signal from the flow signal comprises receiving a first feedback error from the noise reference signal, determining coefficients using the first feedback error, and generating an estimate of a DC component in the flow signal using the coefficients.

Preferably, generating the flow rate signal using the noise reference signal comprises receiving the noise reference signal, receiving the second feedback error from the flow rate signal, and generating the flow rate signal using the noise reference signal and the second feedback error.

Preferably, generating the noise reference signal from the flow signal comprises attenuating a DC component in the flow signal.

Preferably, generating the flow rate signal from the noise reference signal comprises attenuating a noise component in one of the flow signal or a filtered flow signal.

According to an aspect, a system (10, 40) with cascaded adaptive filters for attenuating noise in a feedback path of a flow controller comprises a fluid control system (200). The fluid control system (200) comprises a valve (210) and a flow sensor (220) fluidly coupled to the valve (210). The system (10, 40) also comprises an electronics (100, 400) communicatively coupled to the valve (210) and the flow sensor (220), the flow sensor (220) configured to measure a flow rate of the pulsating flow. The electronics (100, 400) is configured to receive a flow signal (220a) from a flow sensor (220), generate a noise reference signal (110b, 410b) from the flow signal (220a), and generate a flow rate signal (110a, 410a) using the noise reference signal (110b, 410b). The electronics (100, 400) is also configured to generate a flow rate control signal (120a) using the flow rate signal (110a, 410a), generate a valve signal (130a) based on the flow rate control signal (120a), and provide the valve signal (130a) to the valve (210) to control the flow rate of the pulsating flow.

Preferably, the electronics (100, 400) being configured to generate the noise reference signal (110b, 410b) from the flow signal (220a) comprises the electronics (100, 400) being configured to receive a first feedback error (e1) from the noise reference signal (110b, 410b), determine coefficients using the first feedback error (e1), and generate an estimate of a DC component in the flow signal (220a) using the coefficients.

Preferably, the electronics (100, 400) being configured to generate the flow rate signal (110a, 410a) using the noise reference signal (110b, 410b) comprises the electronics (100, 400) being configured to receive the noise reference signal (110b, 410b), receive a second feedback error (e2) from the flow rate signal (110a, 410a), and generate the flow rate signal (110a, 410a) using the noise reference signal (110b, 410b) and the second feedback error (e2).

Preferably, the electronics (100, 400) comprises a first filter (112), the first filter (112) being a DC canceller that generates the noise reference signal (110b, 410b) from the flow signal (220a) by attenuating a DC component in the flow signal (220a) and a second filter (114), the second filter (114) being an adaptive noise cancelling filter configured to generate the flow rate signal (110a, 410a) from the noise reference signal (110b, 410b) by attenuating a noise component in one of the flow signal (220a) and a filtered flow signal (410c).

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of cascaded adaptive filters for attenuating noise in feedback path of a flow controller. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the cascaded adaptive filters for attenuating the noise in the feedback path of the flow controller. As a result, the embodiments described below are not limited to the specific examples described below, but only by the claims and their equivalents.

A System with Cascaded Adaptive Filters

Figure 1:
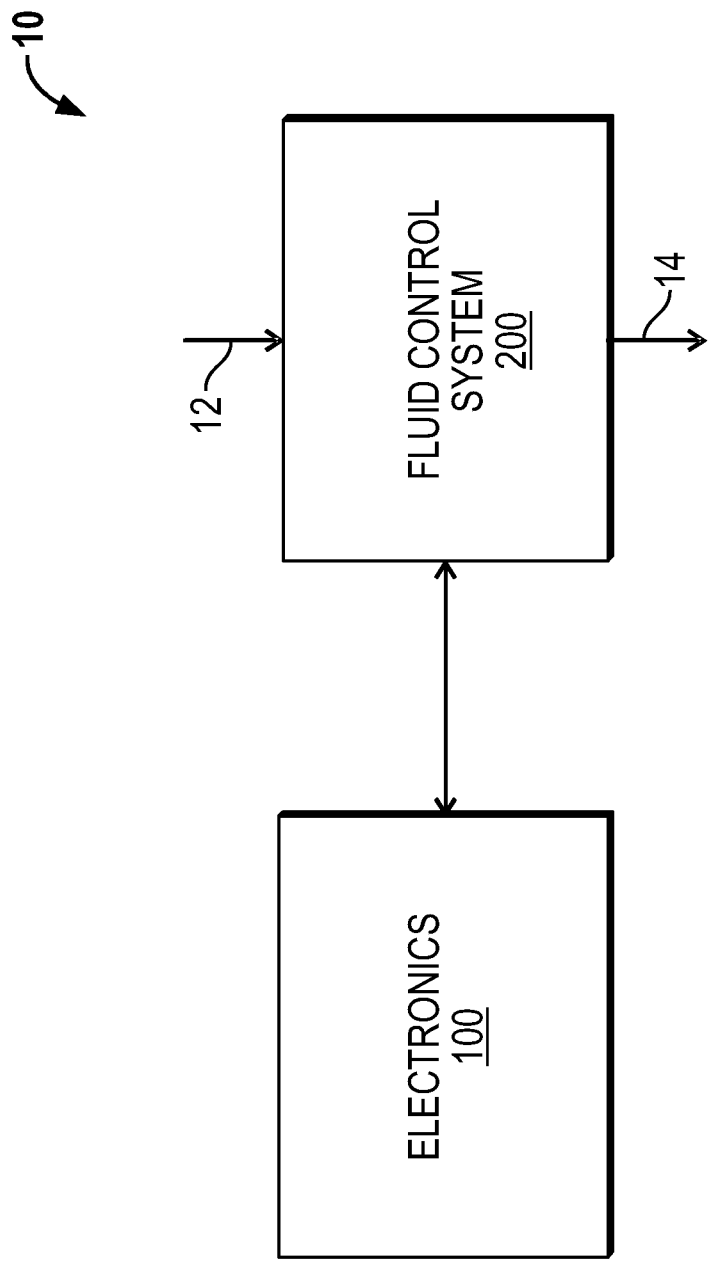
FIG. 1 shows a system 10 for cascaded adaptive filters for attenuating noise in a feedback path of a flow controller according to an embodiment.

FIG. 1 shows a system 10 with cascaded adaptive filters for attenuating noise in a feedback path of a flow controller according to an embodiment. As shown in FIG. 1, the system 10 includes an electronics 100 that is communicatively coupled to a fluid control system 200. The system 10 also includes a fluid supply 12, which is fluidly coupled to the fluid control system 200. The fluid supply 12 may be fluidly coupled to the fluid control system 200 via a conduit, pipeline, or the like. The fluid may be any fluid, such as, for example, compressible or incompressible fluids, fluids with mixed phases, emulsions, suspensions, etc. The fluid control system 200 may control the fluid supplied by the fluid supply 12 to provide a pulsating flow 14, which is illustrated by an arrow. The fluid control system 200 may include a pump with reciprocating motion and, therefore, may be prone to causing one or more pulses in the pulsating flow 14. Similarly, the conduit, pipeline, or the like, may have flow path geometries that induce vortices, which can also lead to the pulsating flow 14.

The electronics 100 may receive a flow signal from, for example, a flow sensor in the fluid control system 200 and provide a valve signal to a flow controller, such as a valve, in the fluid control system 200. The valve signal may be based on a flow rate control signal and a flow signal noise reference that are determined by the electronics 100. The electronics 100 may generate the flow rate control signal and the flow signal noise reference by employing the flow signal from the flow sensor in the fluid control system 200. The flow rate control signal is a signal that controls the flow rate of the fluid in fluid control system 200. The flow signal noise reference may be used by an adaptive filter to generate and provide a cancelling signal that attenuates the noise component in the flow signal. Accordingly, the electronics 100 may attenuate the noise in the flow rate signal, as will be explained in more detail in the following with reference to FIGS. 2-4.

Figure 2:
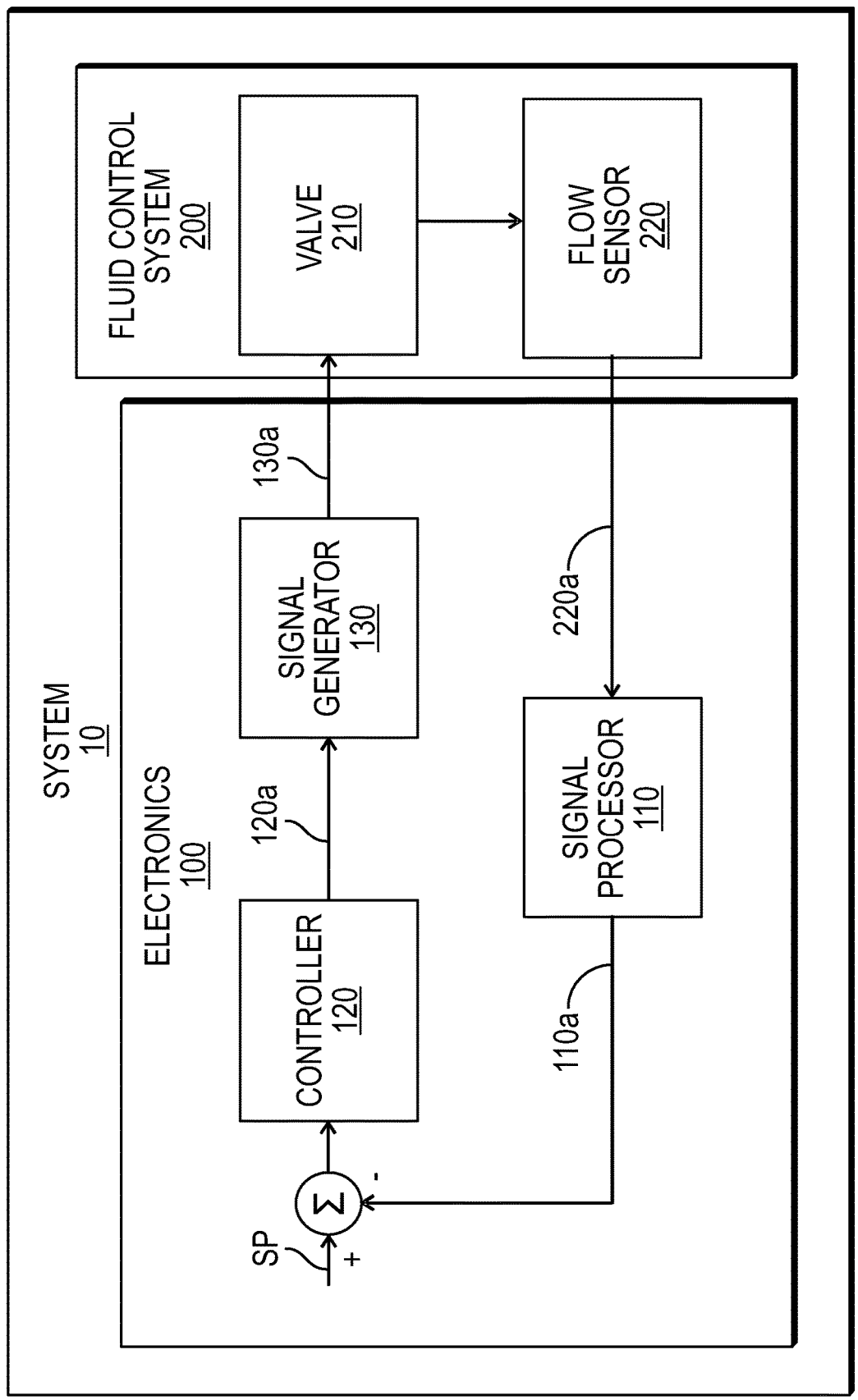
FIG. 2 shows a more detailed view of the system 10 for the cascaded adaptive filters for attenuating the noise in the feedback path of the flow controller.

FIG. 2 shows a more detailed view of the system 10 for the cascaded adaptive filters for attenuating the noise in the feedback path of the flow controller. As shown in FIG. 2, the system 10 includes the electronics 100 and the fluid control system 200 described in the foregoing. For clarity, the system 10 is not shown with the fluid supply 12 and the pulsating flow 14. In the embodiment shown, the electronics 100 includes a signal processor 110 that is communicatively coupled with a controller 120. The controller 120 is also communicatively coupled to a signal generator 130. The signal processor 110 and the signal generator 130 also are communicatively coupled to the fluid control system 200.

In the embodiment shown, the signal processor 110 receives a flow signal 220a from the flow sensor 220. The signal processor 110 employs the flow signal 220a to provide a flow rate signal 110a that is subtracted from a set point SP. The difference between the flow rate signal 110a and the set point SP is provided to the controller 120. The controller 120 receives the difference, determines a flow rate control signal 120a based on the difference, and provides the flow rate control signal 120a to the signal generator 130. The signal generator 130 employs the flow rate control signal 120a to provide a valve signal 130a to the valve 210.

As will be explained in more detail in the following, the electronics 100 is configured to receive the flow signal 220a from the flow sensor 220 and, using the flow signal 220a, generate and provide the valve signal 130a to the valve 210. The electronics 100 can include any appropriate processing system that is configured to process the flow signal 220a to generate the valve signal 130a. For example, the electronics 100 may employ a processor, such as a digital signal processor ("DSP") that is configured to filter, delay, split, combine, amplify, attenuate, or the like, the flow signal 220a. The electronics 100 may also include other electronics such as, for example, a microprocessor that can receive the set point SP, compare the set point SP with a flow rate signal 110a, and output a flow rate control signal 120a. The electronics 100 may also generate the valve signal 130a based on the flow rate control signal 120a.

Signal Processor 110

The signal processor 110 may include an analog-to-digital ("ADC"), DSP, and any other appropriate electronics configured to receive, condition, and filter the flow signal 220a to provide the flow rate signal 110a. For example, the flow signal 220a may be an analog signal comprised of a voltage that increases or decreases in proportion to the fluid flow rate. The signal processor 110 may include signal conditioning circuits that scales, filters, or the like, the flow signal 220a for the ADC. The ADC may sample the conditioned flow signal 220a to provide a sequence of digital representations to the DSP. Using the DSP, the signal processor 110 may filter the sequence of the digital representations to provide the flow rate signal 110a.

For example, as will be explained in more detail in the following with reference to FIGS. 3 and 4, the signal processor 110 may include two or more cascaded filters that separate a DC component and a noise component in the flow signal 220a. In the embodiment shown, the signal processor 110 includes a DC canceller ("DCC") filter that attenuates the DC component in the flow signal 220a, thereby providing the noise component that is associated with the pulses in the pulsating flow. The signal processor 110 may also include an adaptive noise canceller ("ANC") filter that attenuates the noise component in the flow signal 220a to generate a digital representation of a DC component in the flow signal 220a.

The ANC employs a noise reference to attenuate the noise component in the flow signal 220a. As can be appreciated, the noise component provided by the DCC may be employed by the ANC as the noise reference. As can also be appreciated, the DC component of the flow signal 220a provided by the ANC may be proportional to the measured flow rate of the fluid. Therefore, cascading the ANC with the DCC, such that the ANC receives the noise reference from the DCC may result in a flow rate signal with attenuated noise or no noise associated with the pulses in the pulsating flow and is an accurate measurement of the fluid flow rate, which is provided as the flow rate signal 110a.

Controller 120

The controller 120 employs the set point SP and the flow rate signal 110a to determine the flow rate control signal 120a. For example, in the embodiment shown, the controller 120 may be a proportional-integral-differential ("PID") controller, although alternative controllers may be employed in other embodiments. In the embodiment shown, the controller 120 compares the set point SP with the flow rate signal 110a to determine a difference between the set point SP and the flow rate signal 110a. The difference is typically referred to as an error between the set point SP and a measured process variable. The error is then multiplied with the PID parameters to determine a control variable. In the embodiment shown, the measured process variable is the flow rate signal 110a and the control variable is the flow rate control signal 120a.

The flow rate control signal 120a is a signal that corresponds to the error between the measured fluid flow rate and the set point SP. As can be appreciated, due to filtering by the signal processor 110, the flow rate control signal 120a is not generated from a signal that includes a noise component. Accordingly, the flow rate control signal 120a may be stable even though the flow signal 220a may have noise component that are associated with pulses in the pulsating flow. The flow rate control signal 120a is provided to the signal generator 130.

Signal Generator 130

The signal generator 130 receives and converts the flow rate control signal 120a into the valve signal 130a. The valve signal 130a is a signal that controls the fluid flow rate. For example, the valve signal 130a may include a component, such as a current with a magnitude that is proportional to the desired flow rate of the fluid flowing through the fluid control system 200. Alternative signals may be employed in other embodiments.

Fluid Control System 200

The valve 210 may be a proportional valve that controls that fluid flow rate relative to a magnitude of the current in the valve signal 130a, although any suitable valve can be employed in alternative embodiments. In the embodiment shown, the valve 210 includes a valve member that is displaced in proportion to a current of a solenoid in the valve 210. For example, the valve member may have a profile that enlarges or decreases an opening in the valve 210 when the valve member is displaced by the current. Accordingly, the fluid flow may, for example, be linearly proportional to the current provided to the valve 210.

Since, as discussed in the foregoing, the valve signal 130a may not have noise associated with the pulses in the pulsating flow, the valve signal 130a can move the valve member in the valve 210 without oscillations associated with the pulses in the pulsating flow. Therefore, the movement of the valve member in the valve 210 is proportional to the difference between the set point SP and the measured fluid flow rate and may be stable despite the noise component in the flow signal 220a, as will be described in more detail in the following with reference to FIGS. 3-5.

Still referring to FIG. 2, the flow sensor 220 is comprised of a mass flow meter that employs a sensor that may rapidly respond to changes in the flow rate. For example, the flow sensor 220 may employ a thermal dispersion sensor that transfers heat to the fluid from a heated surface. The heated surface may be a wire filament, film heater element, or the like. These are sometimes known as hot-wire or hot-film mass air flow ("MAF") sensors. The heat transfer does not occur to the bulk of the fluid flow, but in a thermal boundary layer around the heated surface. Accordingly, the sensors are sometimes referred to as mass flux sensors. Other sensing technologies may be employed in alternative embodiments.

In thermal dispersion sensors, the heated surface may have a volume that is small relative to the fluid flow. As a result, the heat transfer rate changes rapidly in response to changes in the flow rate of the fluid. This characteristic makes them sensitive to local and rapid flow perturbations such as eddies and vortices, as well as pulsating or periodic variations in the bulk flow. The rapid response of the sensor to the changes in the flow rate of the fluid may be viewed as a low pass filter with a cut-off frequency high enough to sense all of the pulses or FBN in the pulsating flow. Therefore, the flow signal 220a provided by the flow sensor 220 not only includes a DC component that corresponds to the fluid flow rate but also the noise component that corresponds to the pulses in the pulsating flow.

As discussed in the foregoing and explained in more detail in the following with reference to FIGS. 3-5, cascaded filters may be employed by the flow signal 220a to generate the valve signal 130a, which may not have the noise component in the flow signal 220a.

First Exemplary Configuration of Cascaded Adaptive Filters

Figure 3:
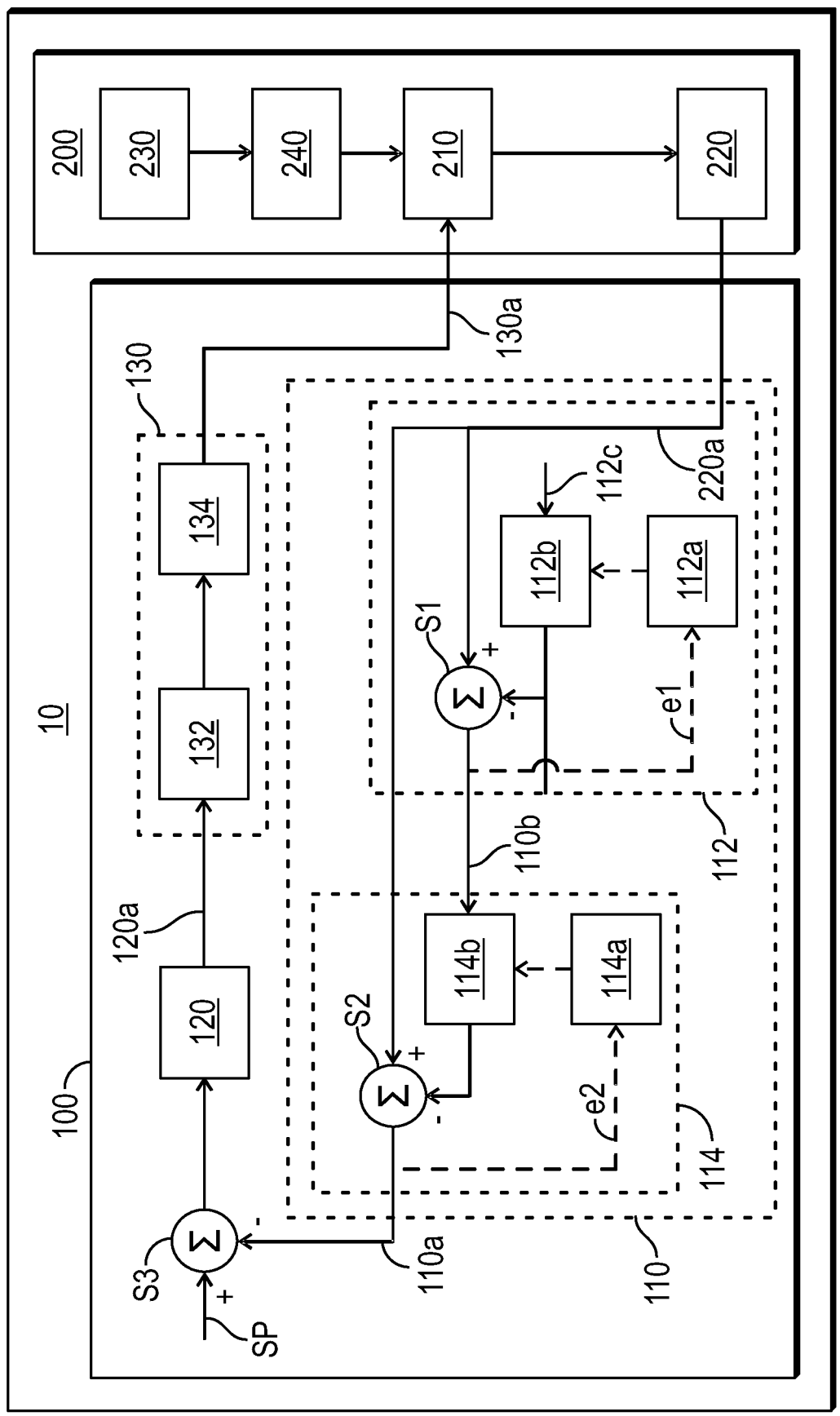
FIG. 3 shows a more detailed view of the system 10 with the cascaded adaptive filters for attenuating noise in the feedback path of the flow controller.

FIG. 3 shows a more detailed view of the system 10 with the cascaded adaptive filters for attenuating noise in the feedback path of the flow controller. As shown in FIG. 3, the system 10 includes the electronics 100 and fluid control system 200 described in the foregoing with reference to FIGS. 1 and 2. The signal processor 110, controller 120, and signal generator 130 as well as the set point SP, flow rate signal 110a, flow rate control signal 120a, and valve signal 130a are also shown. In the more detailed view, the signal processor 110 includes a first filter 112 and a second filter 114 communicatively coupled. Also in the more detailed view, the signal generator 130 includes a pulse width modulator 132 communicatively coupled with a valve drive 134. The valve signal 130a is provided by the valve drive 134.

In addition to the valve 210 and the flow sensor 220 shown in FIG. 2, the fluid control system 200 includes a pump 230 and pressure regulator 240. In the embodiment shown, the pump 230 may be a local air generator with a piston that compresses air for use in a pneumatic system. Using a local air generator may be advantageous over, for example, bottled air due to smaller utilized space, sustained supply, etc. However, the pump 230 may be prone to providing compressed air with pulsating flow.

The pressure regulator 240 may be a pressure regulator that controls the pressure to prevent the compressed air from deviating from a desired pressure level. However, in alternative embodiments, other configurations may be employed. The pulses may also be caused by something other than the pump 230. In the embodiment shown, the pump 230 receives fluid from a fluid supply and provides the fluid, via the pressure regulator 240, to the valve 210 and the flow sensor 220, which may control and measure the fluid flow rate.

Filters

Also shown in FIG. 3 is a more detailed view of the signal processor 110. In the more detailed view, the first filter 112 provides a noise reference signal 110b to the second filter 114. The second filter 114 is communicatively coupled with the flow sensor 220 and is configured to receive the flow signal 220a from the flow sensor 220. The second filter 114 is also communicatively coupled with the controller 120. In the embodiment shown, the second filter 114 provides the flow rate signal 110a, which is subtracted from the set point SP at a third summation S3. The difference between the flow rate signal 110a and the set point SP is provided to the controller 120.

A first summation S1 in the first filter 112 receives the flow signal 220a from the flow sensor 220. A first adaptive algorithm 112a is communicatively coupled to the first summation S1. More specifically, the first adaptive algorithm 112a is configured to receive a first feedback error e1 from the noise reference signal 110b. The first adaptive algorithm 112a employs the first feedback error e1 to determine and provide coefficients to the first digital filter 112b, which will be discussed in more detail below. A DC reference 112c is provided to the first digital filter 112b. The DC reference 112c is set at a constant value, such as '1', although any suitable value may be employed in alternative embodiments. The first digital filter 112b provides an estimate of the DC component in the flow signal 220a that, when subtracted from the flow signal 220a, provides the noise reference signal 110b.

A second summation S2 in the second filter 114 receives the flow signal 220a from the flow sensor 220. A second adaptive algorithm 114a is communicatively coupled to the second summation S2. More specifically, the second adaptive algorithm 114a is configured to receive a second feedback error e2 from the flow rate signal 110a. The second adaptive algorithm 114a employs the second feedback error e2 to provide coefficients to the second digital filter 114b, which will be discussed in more detail below. The noise reference signal 110b is provided to the second digital filter 114b. The second digital filter 114b employs the noise reference signal 110b as a noise reference to attenuate the noise in the flow signal 220a. More specifically, the second digital filter 114b uses the noise reference signal 110b to provide an estimate of the noise component in the flow signal 220a to the second summation S2. The estimate is subtracted from the flow signal 220a to attenuate the noise in the flow signal 220a. The signal provided to the second summation S2 is generated using the coefficients provided by the adaptive algorithms 112a, 114a.

The adaptive algorithms 112a, 114a receive the first and second feedback error e1, e2, and determine and provide coefficients for the digital filters 112b, 114b. The adaptive algorithms 112a, 114a may be any appropriate algorithm configured to determine (e.g., calculate, estimate, etc.) the coefficients for the digital filters 112b, 114b. For example, in the embodiment shown, the adaptive algorithms 112a, 114a may be a least mean-square ("LMS") algorithm. However, other algorithms may be employed in the same or alternative embodiments.

The digital filters 112b, 114b filter their respectively received signals using the coefficients determined by the adaptive algorithms 112a, 114a. For example, the digital filters 112b, 114b may be finite impulse response ("FIR") filters with N number of taps of the received signal. Other filters, such as an infinite impulse response filter ("IIR") filter may be employed in alternative embodiments. Each of the taps may have an associated coefficient determined by the adaptive algorithms 112a, 114a. The values of the coefficients determine the properties of the filter such as, for example, the attenuating frequency, magnitude of the attenuation, or the like. As will be explained in more detail in the following, the first filter 112 provides the noise reference signal 110b to the second filter 114. The second filter 114 employs the noise reference signal 110b to attenuate the noise in the flow signal 220a.

In the embodiment shown, the first filter 112 is a DCC that adaptively filters the DC component from the flow signal 220a. Based on the first feedback error e1, the first adaptive algorithm 112a determines the coefficients that attenuate the DC component in the flow signal 220a. More specifically, the DC reference 112c serves as a reference signal for a notch filter where, in the embodiment shown, the value of '1' serves as a reference signal for a DC component or low frequency drift that may be present in the flow signal 220a. Accordingly, the first digital filter 112b uses the first feedback error e1 to output a signal that is an estimate of the DC component in the flow signal 220a.

The signal outputted by the first digital filter 112b is provided to the first summation S1. Since the signal outputted by the first digital filter 112b tracks or is equivalent to the DC component of the flow signal 220a, subtracting the signal outputted by the first digital filter 112b from the flow signal 220a results in the noise component of the flow signal 220a. The noise component in the flow signal 220a may be due to the pulses in the pulsating flow. Therefore, the noise reference signal 110b from the first summation S1 may serve as a noise reference for the second filter 114.

In the embodiment shown, the second filter 114 is an adaptive noise canceller ("ANC") that employs the noise reference signal 110b to filter the noise component from the flow signal 220a. In the embodiment shown, the second adaptive algorithm 114a is configured to receive the second feedback error e2 and, using the second feedback error e2, determine coefficients for the second digital filter 114b. More specifically, the second feedback error e2 is associated with the noise component in the flow signal 220a. Accordingly, the coefficients determined from the second feedback error e2 may ensure that a signal provided by the second digital filter 114b is an accurate estimate of the noise component in the flow signal 220a.

The signal provided by the second digital filter 114b is subtracted from the flow signal 220a at the second summation S2. Since the signal provided by the second digital filter 114b maybe an accurate estimate of the noise component in the flow signal 220a, subtracting the signal provided by the second digital filter 114b from the flow signal 220a results in the DC component in the flow signal 220a. Accordingly, the flow rate signal 110a may be an accurate flow rate measurement that is free of the noise component in the flow signal 220a. The flow rate signal 110a is provided to the third summation S3, which determines a difference between the set point SP and the flow rate signal 110a.

As discussed in the foregoing, the controller 120 employs the difference to determine the flow rate control signal 120a. The signal generator 130 uses the flow rate control signal 120a to generate the valve signal 130a, which controls the valve 210 so the fluid flow rate trends towards or remains stable at the set point SP. Since the flow rate signal 110a may not have the noise component associated with the pulses, the movement of the valve member in the valve 210 may not be affected by the pulses in the pulsating stream, resulting in a more stable fluid flow despite the presence of the pulses. Similar results may be obtained from other embodiments of cascaded adaptive filters for attenuating noise in a feedback path of flow controller, one of which is described in the following with reference to FIG. 4.

Second Exemplary Configuration of Cascaded Adaptive Filters

Figure 4:
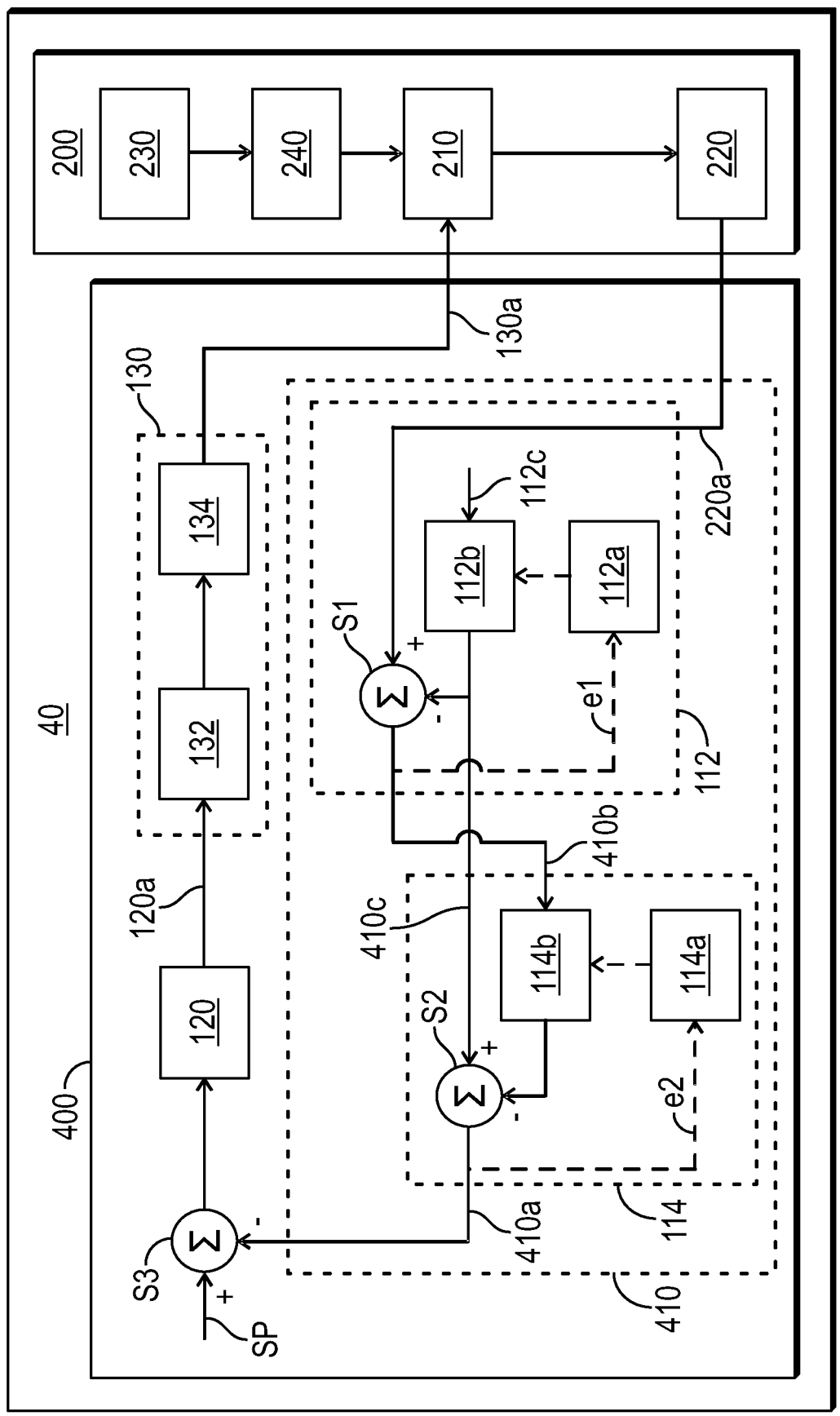
FIG. 4 shows a detailed view of another system 40 with cascaded adaptive filters for attenuating noise in a feedback path of a flow controller.

FIG. 4 shows a detailed view of another system 40 with cascaded adaptive filters for attenuating noise in a feedback path of a flow controller. As shown in FIG. 4, the system 40 includes an electronics 400 and the fluid control system 200 described in the foregoing with reference to FIG. 3. The electronics 400 is similar to the electronics 100 shown in FIG. 3. However, the electronics 400 includes a signal processor 410, which has a different configuration than the signal processor 110. The controller 120, signal generator 130, valve 210, flow sensor 220, pump 230, and pressure regulator 240, which were described in the foregoing with reference to FIG. 3, are also shown.

Similar to the electronics 100 described in the foregoing, the electronics 400 is configured to receive the flow signal 220a from the flow sensor 220 and, using the flow signal 220a, generate and provide the flow rate control signal 120a and the valve signal 130a. The electronics 400 can include any appropriate processing system in a manner similar to that described with reference to the electronics 100. As with the signal processor 110 described with reference to FIG. 3, the signal processor 410 may include an ADC, DSP, or any other appropriate electronics configured to receive and filter the flow signal 220a to provide the flow rate signal 410a.

Filters

In the embodiment shown and similar to the signal processor 110, the signal processor 410 includes the first filter 112 communicatively coupled to a second filter 114. The first filter 112 receives the flow signal 220a and the second filter 114 provides the flow rate signal 410a. The second filter 114 employs a noise reference signal 410b and a filtered flow signal 410c to generate the flow rate signal 410a. As will be explained in more detail in the following, the filtered flow signal 410c is an output from the first digital filter 112b. The noise reference signal 410b is a noise reference for the second digital filter 114b. The flow rate signal 410a is subtracted from the set point SP at a third summation S3. The difference between the flow rate signal 410a and the set point SP is provided to the controller 120.

The first summation S1 in the first filter 112 receives the flow signal 220a from the flow sensor 220. The first adaptive algorithm 112a is communicatively coupled to the first summation S1. More specifically, the first adaptive algorithm 112a is configured to receive the first feedback error e1 from the noise reference signal 410b. The first adaptive algorithm 112a employs the first feedback error e1 to determine and provide coefficients to the first digital filter 112b, which will be discussed in more detail below. The DC reference 112c is provided to the first digital filter 112b. The DC reference 112c is set at a constant value, such as '1', although any suitable value may be employed in alternative embodiments. The first digital filter 112b provides an estimate of the DC component in the flow signal 220a that, when subtracted from the flow signal 220a, provides the noise reference signal 410b. The filtered flow signal 410c is provided to the second summation S2 in the second filter 114.

The second summation S2 in the second filter 114 receives the filtered flow signal 410c from the first digital filter 112b. The second adaptive algorithm 114a is communicatively coupled to the second summation S2. More specifically, the second adaptive algorithm 114a is configured to receive the second feedback error e2 from the flow rate signal 410a. The second adaptive algorithm 114a employs the second feedback error e2 to determine and provide coefficients to the second digital filter 114b, which will be discussed in more detail below. The noise reference signal 410b is provided to the second digital filter 114b. The second digital filter 114b employs the noise reference signal 410b as a noise reference to attenuate the noise in the filtered flow signal 410c. More specifically, the second digital filter 114b uses the noise reference signal 410b to provide an estimate of the noise component in the flow signal 220a to the second summation S2. This signal is subtracted from the filtered flow signal 410c to attenuate the noise in the filtered flow signal 410c.

The filters 112, 114 are configured to operate in a manner similar described in the foregoing with reference to FIG. 3. The signal received by the second summation S2 is a distinguishing feature between the signal processor 110 and the signal processor 410. In the embodiment shown in FIG. 3, the second summation S2 receives the flow signal 220a from the flow sensor 220. In the embodiment shown in FIG. 4, the second summation S2 receives the filtered flow signal 410c. Similar to the noise reference signal 110b shown in FIG. 3, the noise reference signal 410b is provided to the second digital filter 114b. Accordingly, the flow rate signal 410a may be a DC signal that does not have the noise component in the flow signal 220a.

The systems 10, 40 described in the foregoing employ cascaded filters configured to provide the flow rate signal 110a and flow rate signal 410a that may include attenuated noise or no noise from the pulses in the pulsating flow. Since the flow rate signal 110a, 410a may not include the noise associated with the pulses in the pulsating flow, the operation of the valve 210 can be stable. Exemplary methods that employ cascaded filters are described in more detail in the following with reference to FIG. 5.

Method Employing Cascaded Adaptive Filters

Figure 5:
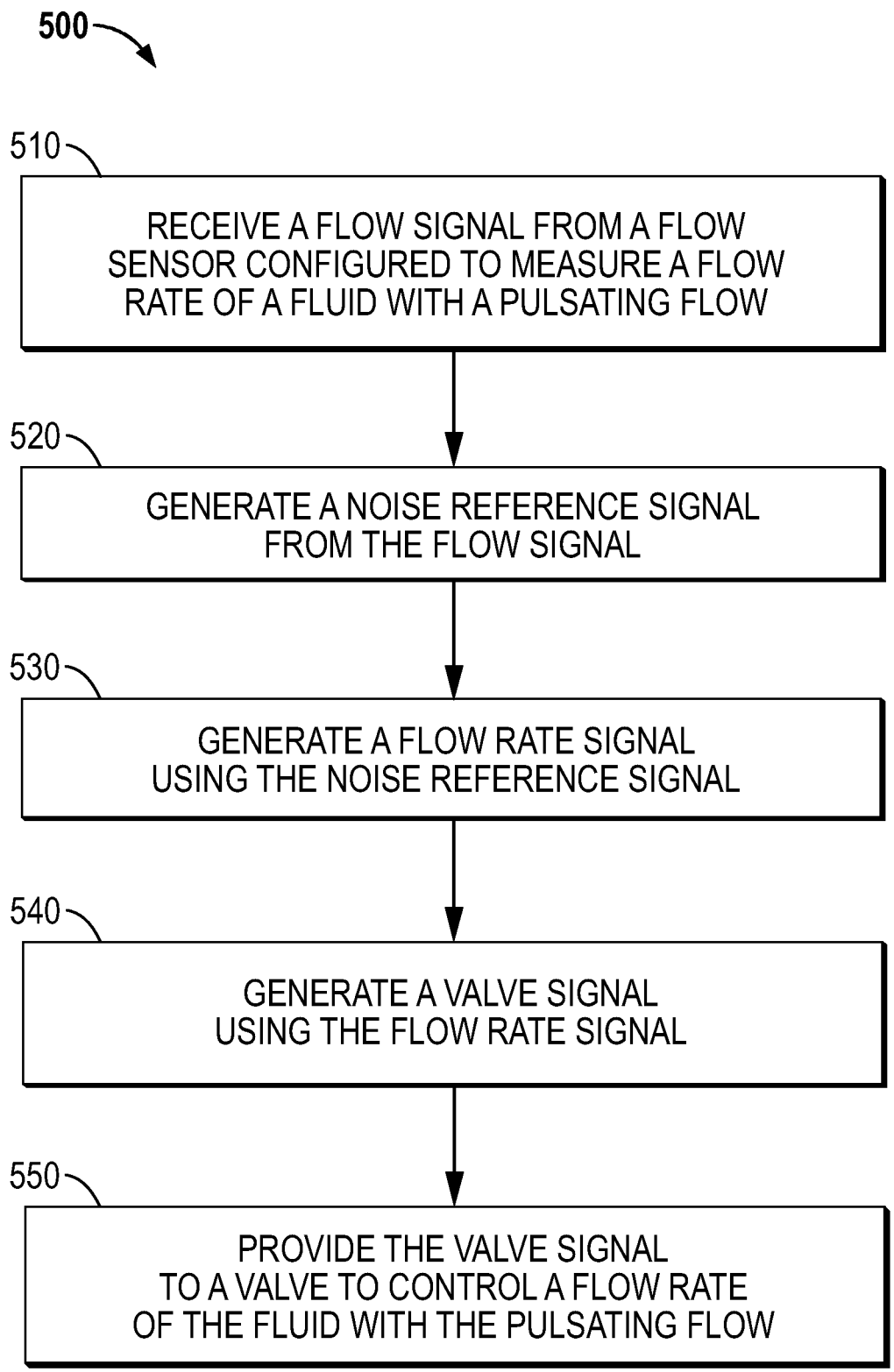
FIG. 5 shows a method 500 employing cascaded adaptive filters for attenuating noise in a feedback path of a flow controller according to an embodiment.

FIG. 5 shows a method 500 employing cascaded adaptive filters for attenuating noise in a feedback path of a flow controller according to an embodiment. The method may be performed by the systems 10, 40 described in the foregoing although any suitable system may be employed in alternative embodiments. The method 500 begins with step 510 by receiving a flow signal from a flow sensor configured to measure a flow rate of a fluid with a pulsating flow. In step 520, the method 500 generates a noise reference signal from the flow signal. Using the noise reference signal, the method 500, in step 530, generates a flow rate signal. The flow rate signal may be proportional to a flow rate of the fluid with the pulsating flow. In step 540, the method 500 generates a valve signal using the flow rate signal. The valve signal is provided to a valve to control the flow rate of the fluid.

The flow signal in step 510 may be the flow signal 220a provided by, for example, the flow sensor 220 described in the foregoing. The flow signal may have a DC component that is proportional to the flow rate of the fluid with the pulsating flow. Due to pulses in the pulsating flow, the flow signal may also include a noise component. However, steps 520 through 540 may attenuate the noise in the flow signal to provide a flow rate signal.

For example, step 520 may generate the noise reference signal from the flow signal by filtering the DC component from the flow signal. The DC component may be filtered by generating an estimate of the DC component in the flow signal DC using a feedback error from the attenuated flow signal and subtracting the estimated DC component from the flow signal. With reference to the systems 10, 40 described in the foregoing, the DC component may be filtered by the first filter 112, although any suitable filter may be employed in alternative embodiments. In these and other embodiments, the noise reference signal may be provided to a second filter.

In step 530, the flow rate signal may be generated by employing a second filter that employs the noise reference signal provided by the first filter. In one embodiment, the output from the second filter is subtracted from the flow signal. In another embodiment, the output from the second filter is subtracted from a DC output from the first filter. The flow rate signal may be generated by alternative methods in other embodiments.

In the embodiments described in the foregoing, the subtraction attenuates the noise component in the flow signal, or the like, to provide the DC component of the flow signal. The DC component of the flow signal may represent the measured flow rate of the fluid with the pulsating flow. The DC component can be subtracted from a set point SP to provide the valve signal. Since the valve signal is generated from the DC component with attenuated or no noise in the flow signal, the movement of a valve member in the valve may be stable. Therefore, the fluid flow rate may trend towards or remain stable at the point SP even though there are pulses in the pulsating flow.

As discussed in the foregoing, the flow signal 220a may be filtered by cascaded filters to provide signals employed to generate the valve signal 130a. Exemplary signals are described in the following with reference to FIG. 6.

Exemplary Signals

Figure 6:
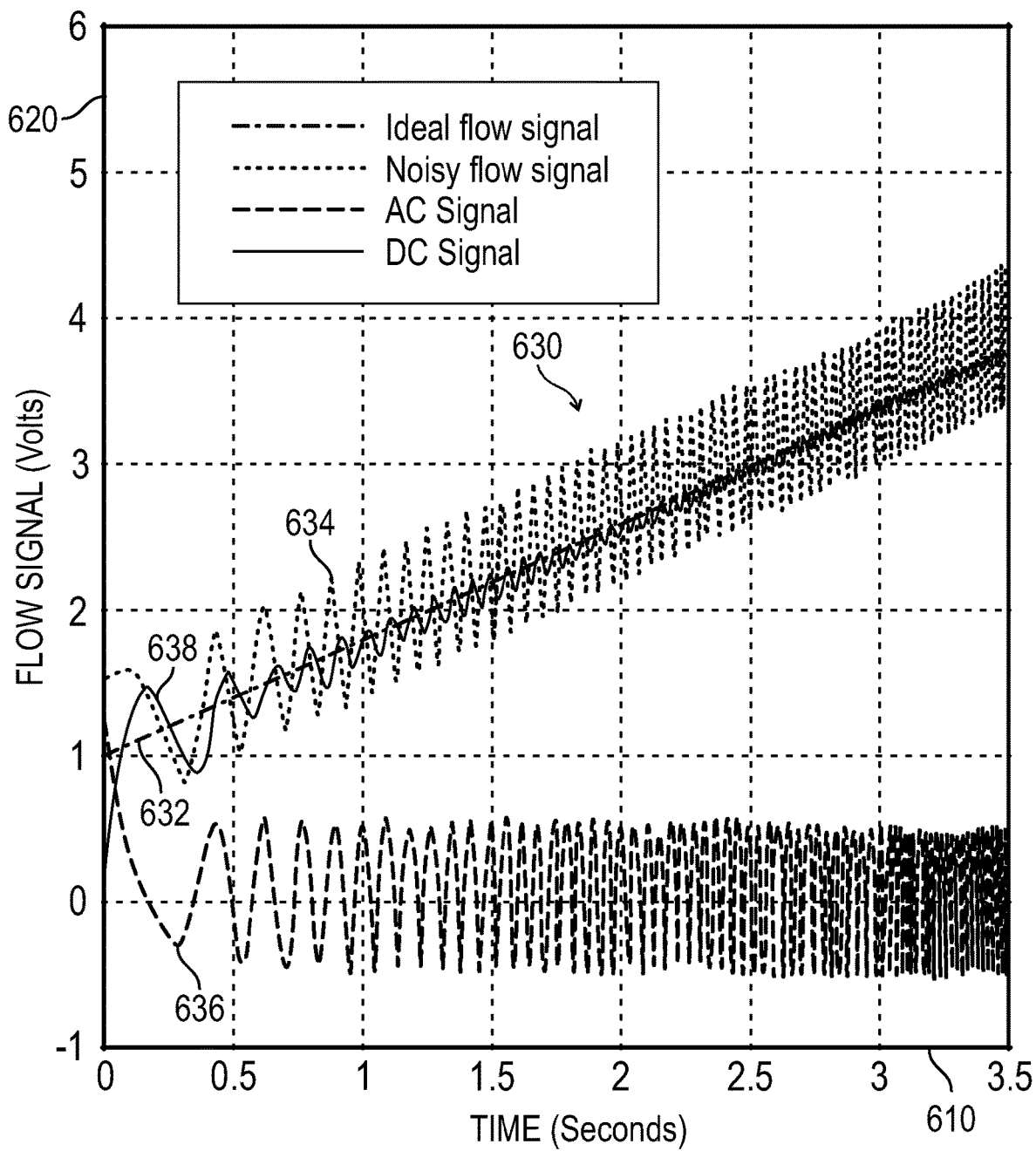
FIG. 6 shows a graph 600 illustrating signals that are received, filtered, and generated by cascaded filters according to an embodiment.

FIG. 6 shows a graph 600 illustrating signals that are received, filtered, and generated by cascaded filters according to an embodiment. The graph 600 includes an abscissa, which is a time axis 610, and an ordinate, which is a flow signal axis 620. The time axis 610 is in units of seconds and the flow signal axis 620 is in units of volts, although any suitable units may be employed in alternative embodiments. Also shown is a legend to assist in understanding the graph 600. The graph 600 also includes signals 630. The signals 630 are comprised of an ideal flow plot 632, flow signal plot 634, noise reference plot 636, and flow rate plot 638. The signals 630 may be compared to illustrate the operation of the cascaded filters. Alternative embodiments of the signals 630 may include more or fewer and/or different flow signals.

In the embodiment shown, the ideal flow plot 632 illustrates a desirable flow rate over time. The desirable flow rate may be the set point SP described in the foregoing. As can be appreciated from FIG. 6, the ideal flow plot 632 increases linearly over time from about 1 volt to about 3.7 volts. However, in alternative embodiments, the ideal flow plot 632 may non-linearly increase or decrease, be constant, or the like.

The flow signal plot 634 may be the flow signal 220a described in the foregoing. As can be appreciated, the flow signal plot 634 trends at a rate that is consistent with the ideal flow plot 632. However, the flow signal plot 634 also includes noise due to pulses in a pulsating flow. The noise in the flow signal plot 634 is illustrated as oscillations. As can be appreciated, the frequency of the oscillations is increasing over time. That is, as time increases, the time period between each cycle is decreasing. Therefore, a passive filter with a cutoff frequency that is greater than the lowest frequency (at 0 seconds) and less than the highest frequency (at 3.5 seconds) of the flow signal plot 634 may not attenuate all of the noise in the flow signal plot 634.

The noise reference plot 636 may be the noise reference signals 110b, 410b described in the foregoing, which are provided by the first filter 112. As can be appreciated from FIG. 6, the noise reference plot 636 does not trend with the ideal flow plot 632. Accordingly, in addition, the oscillations of the noise reference plot 636 correspond to the oscillations of the flow signal plot 634. That is, the phase and magnitude of the oscillations in the noise reference plot 636 are about the same as the phase and magnitude of the oscillations in the flow signal plot 634. Therefore, the noise reference plot 636 may be employed by an adaptive filter, such as the second filter 114 described in the foregoing, to attenuate the noise component in the flow signal plot 634.

The flow rate plot 638 may be the flow rate signals 110a, 410a described in the foregoing with reference to FIGS. 3 and 4. As can be appreciated, the flow rate plot 638 includes oscillations that correspond to the oscillations in the flow signal plot 634. However, the oscillations in the flow rate plot 638 decrease as the time increases. As can also be appreciated, the oscillations in the flow rate plot 638 decrease as the time increases even though the frequency of the oscillations in the flow signal plot 634 increase.

Operation of Cascaded Filters

To illustrate how the signals 630 are generated by the cascaded filters, we refer to the embodiments described in the foregoing with reference to FIGS. 3-5. However, the embodiments described with reference to FIGS. 3-5 may employ any appropriate signals in alternative embodiments. In the embodiments described in the foregoing, the first filter 112 may receive the flow signal plot 634 in the graph 600. The flow signal plot 634 may be representative of the flow signal 220a.

The first adaptive algorithm 112a in the first filter 112 may also receive the first feedback error e1 from the first summation S1. Using the first feedback error e1, the first adaptive algorithm 112a can provide coefficients to the first digital filter 112b. The first digital filter 112b also receives and operates on the DC reference 112c. Accordingly, the first digital filter 112b employs the DC reference 112c to generate the noise reference signals 110b, 410b, which is illustrated by the noise reference plot 636.

To generate the noise reference signals 110b, 410b, the first adaptive algorithm 112a iteratively adjusts the coefficients provided to the first digital filter 112b based on the first feedback error e1 such that the DC in the flow signal 220a is filtered. For example, the first adaptive algorithm 112a may adjust the coefficients provided to the first digital filter 112b according to the LMS algorithm, which minimizes the first feedback error e1 received from the first summation S1. However, any suitable algorithm may be employed in alternative embodiments.

Referring to the noise reference plot 636 shown in FIG. 6, the DC component has been filtered from the flow signal plot 634. Accordingly, the noise reference plot 636 does not increase over time. In addition, the noise reference plot 636 symmetrically oscillates about zero volts. The noise reference plot 636 may be generated by subtracting the estimate of the DC component in the flow signal 220a at the first summation. That is, the estimate tracks the increasing DC component in the flow signal plot 634 and, therefore, when the estimate is subtracted from the flow signal plot 634, the output may be the noise reference plot 636, which is representative of the noise reference signals 110b, 410b provided to the second filter 114.

The second filter 114 employs the noise reference signals 110b, 410b to attenuate the noise in the flow signals 220a, 410c. For example, the second filter 114 may receive the noise reference plot 636 shown in FIG. 6 and, using an adaptive filter, adjust the phase and magnitude of the noise reference plot 636 to attenuate the noise in the flow signal plot 634. For example, the second adaptive algorithm 114a may receive the second feedback error e2 from the second summation S2. The second adaptive algorithm 114a may iteratively generate and provide the coefficients to the second digital filter 114b to attenuate the noise.

Due to the iterative adjustment of the coefficients provided to the second digital filter 114b, the noise in the flow signal 220a may attenuate over time. This is illustrated by the flow rate plot 638 shown in FIG. 6. As can be appreciated, the coefficients provided by the first adaptive algorithm 112a at zero seconds are different from the coefficients provided by the first adaptive algorithm 112a at 3.5 seconds. As can also be appreciated, the second feedback error e2 is also minimized as time increases. This minimization may be done by employing a LMS algorithm, as described in the foregoing with reference to FIGS. 3-5.

The embodiments described above provide systems 10, 40 that include electronics 100, 400 with cascaded filters 112, 114 for attenuating noise in a feedback path of a flow controller. The cascaded filters 112, 114 can employ a noise reference provided by the flow signal 220a, thereby providing an accurate representation of the noise in the feedback path of the flow controller. The noise reference signal may be generated by the first filter 112. The second filter 114 employs the accurate representation to generate the flow rate signals 110a, 410a, which may have attenuated noise or no noise. Since the flow rate signals 110a, 410a may have attenuated noise or no noise, the difference between the set point SP and the flow rate signals 110a, 410a is stable and an accurate representation of the difference between the flow rate of the pulsating flow and the set point SP. Accordingly, the valve 210 may stably move towards or remain at the set point SP even though there may be pulses in the pulsating flow.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other cascaded adaptive filters for attenuating noise in a feedback path of a flow controller. Accordingly, the scope of the embodiments described above should be determined from the following claims.

I claim:

1. An electronics with cascaded adaptive filters for attenuating noise in a feedback path of a flow controller, wherein the electronics is comprised of:
    a signal processor configured to:
        receive a flow signal from a flow sensor, the flow sensor being configured to measure a flow rate of the pulsating flow;
        generate, using the received flow signal, a noise reference signal; and
        generate, using the generated noise reference signal, a flow rate signal;
    a controller communicatively coupled to the signal processor, the controller being configured to generate, using the flow rate signal, a flow rate control signal; and
    a signal generator communicatively coupled to the controller, the signal generator being configured to:
        receive the flow rate control signal;
        generate, based on the flow rate control signal, a valve signal; and
        provide the valve signal to a valve to control the flow rate of the pulsating flow.

2. The electronics of claim 1, wherein the signal processor being configured to generate the noise reference signal from the flow signal comprises the signal processor being configured to:
    receive a first feedback error from the noise reference signal;
    determine coefficients using the first feedback error; and
    generating an estimate of a DC component in the flow signal using the coefficients.

3. The electronics of claim 1, wherein the signal processor being configured to generate the flow rate signal using the noise reference signal comprises the signal processor being configured to:
    receive the noise reference signal;
    receive a second feedback error from the flow rate signal; and
    generate the flow rate signal using the noise reference signal and the second feedback error.

4. The electronics of claim 1, wherein the signal processor is comprised of a first filter, the first filter being comprised of a DC canceller that generates the noise reference signal from the flow signal by attenuating a DC component in the flow signal.

5. The electronics of claim 1, wherein the signal processor is comprised of a second filter the second filter being an adaptive noise cancelling filter configured to generate the flow rate signal from the noise reference signal by attenuating a noise component in one of the flow signal and a filtered flow signal.

6. The electronics of claim 1, wherein the signal generator is comprised of a pulse width modulator and a valve drive circuit.

7. A method employing cascaded adaptive filters for attenuating noise in a feedback path of a flow controller, the method comprising:
   receiving a flow signal from a flow sensor, the flow sensor being configured to measure a flow rate of the pulsating flow;
   generating a noise reference signal from the flow signal;
   generating a flow rate signal using the noise reference signal;
   generating a flow rate control signal using the flow rate signal;
   receiving the flow rate control signal;
   generating a valve signal based on the flow rate control signal; and
   providing the valve signal to a valve to control the flow rate of the pulsating flow.

8. The method of claim 7, wherein generating the noise reference signal from the flow signal comprises:
   receiving a first feedback error from the noise reference signal;
   determining coefficients using the first feedback error; and
   generating an estimate of a DC component in the flow signal using the coefficients.

9. The method of claim 7, wherein generating the flow rate signal using the noise reference signal comprises:
   receiving the noise reference signal;
   receiving the second feedback error from the flow rate signal; and
   generating the flow rate signal using the noise reference signal and the second feedback error.

10. The method of claim 7, wherein generating the noise reference signal from the flow signal comprises attenuating a DC component in the flow signal.

11. The method of claim 7, wherein generating the flow rate signal from the noise reference signal comprises attenuating a noise component in one of the flow signal or a filtered flow signal.

12. A system with cascaded adaptive filters for attenuating noise in a feedback path of a flow controller, the system comprising:
   a fluid control system comprising:
      a valve; and
      a flow sensor fluidly coupled to the valve, the flow sensor configured to measure a flow rate of the pulsating flow; and
   an electronics communicatively coupled to the valve and the flow sensor, the electronics configured to:
      receive a flow signal from a flow sensor;
      generate, from the received flow signal, a noise reference signal;
      generate, using the generated noise reference signal, a flow rate signal;
      generate, using the generated flow rate signal, a flow rate control signal;
      generate, based on the generated flow rate control signal, a valve signal; and
      provide the valve signal to the valve to control the flow rate of the pulsating flow.

13. The system of claim 12, wherein the electronics being configured to generate the noise reference signal from the flow signal comprises the electronics being configured to:
   receive a first feedback error from the noise reference signal;
   determine coefficients using the first feedback error; and
   generate an estimate of a DC component in the flow signal using the coefficients.

14. The system of claim 12, wherein the electronics being configured to generate the flow rate signal using the noise reference signal comprises the electronics being configured to:
   receive the noise reference signal;
   receive a second feedback error from the flow rate signal; and
   generate the flow rate signal using the noise reference signal and the second feedback error.

15. The system of claim 12, wherein the electronics comprises:
   a first filter, the first filter being a DC canceller that generates the noise reference signal from the flow signal by attenuating a DC component in the flow signal; and
   a second filter, the second filter being an adaptive noise cancelling filter configured to generate the flow rate signal from the noise reference signal by attenuating a noise component in one of the flow signal and a filtered flow signal.

* * * * *